United States Patent [19]

Nelson

[11] Patent Number: 5,133,159
[45] Date of Patent: Jul. 28, 1992

[54] METHOD FOR POLISHING SILICONE PRODUCTS

[75] Inventor: Douglas J. Nelson, Everett, Wash.

[73] Assignee: Nestle S.A., Vevey, Switzerland

[21] Appl. No.: 629,784

[22] Filed: Dec. 18, 1990

Related U.S. Application Data

[63] Continuation of Ser. No. 297,103, Jan. 13, 1989, abandoned.

[51] Int. Cl.$^5$ .............................................. B24B 31/00
[52] U.S. Cl. ........................................ 51/313; 51/317; 51/284 E; 134/7
[58] Field of Search ............. 51/317, 316, 313, 163.1, 51/164.1, 7, 284 E; 134/7

[56] References Cited

U.S. PATENT DOCUMENTS

| | | | |
|---|---|---|---|
| 2,554,701 | 5/1951 | Hackett et al. | 51/163.1 |
| 3,535,159 | 10/1970 | Shiro | 134/7 |
| 3,997,358 | 12/1976 | Taylor | 51/313 |
| 4,257,196 | 3/1981 | Walther et al. | 51/316 |
| 4,580,371 | 4/1986 | Akhavi | 51/284 E |
| 4,796,388 | 1/1989 | Steckis | 51/164.1 |

FOREIGN PATENT DOCUMENTS 0032591  6/1988  Japan ........................................ 51/7

Primary Examiner—Robert A. Rose
Attorney, Agent, or Firm—Julie J. L. Cheng; Sally S. Yeager

[57] ABSTRACT

A method for polishing articles manufactured from silicone rubber or silicone elastomers is disclosed. This method includes tumble-polishing in a receptacle charged with polishing objects, an alcohol solvent, and silicone articles for a period of time and at a rotation speed sufficient to remove surface irregularities and produce the desired finish and/or improve the optical transparency of the silicone articles. This method is particularly useful in the polishing of biomedical articles such as intraocular or soft contact lenses, tips of cannulae, and articles such as O-rings for precision mechanical devices.

23 Claims, 8 Drawing Sheets

LM 75x

LM 75x

METHOD FOR POLISHING SILICONE PRODUCTS

This is a continuation of U.S. patent application Ser. No. 07/297,103 filed Jan. 13, 1989 now abandoned.

BACKGROUND OF THE INVENTION

1. Field of the Invention

The present invention relates to methods of manufacturing products from silicone elastomers. More particularly, the present invention relates to an improved method of polishing silicone products in an alcohol or solvent solution and in the absence of any polishing abrasives to remove flashing or other sharp edges from the molded or stamped silicone or elastomer products.

2. General Background

Silicone materials such as silicone rubbers and silicone elastomers are used in the manufacture of a wide variety of products. These materials are particularly useful in biomedical applications because they are compatible with biological tissues and fluids, and are permeable to gases such as oxygen and carbon dioxide. Other desirable characteristics of silicone elastomer products include their flexibility, ease of molding, and relatively low cost.

Examples of such silicone elastomer products include soft contact lenses, intraocular lenses, medical catheters and cannulae, prosthetic implants, contraceptive devices, O-rings and other products in the automotive and other industries which require articles having a rounded, smooth, highly polished finish.

A highly polished finish, free of any sharp edges or surface irregularities, is required in biomedical applications. The silicone product is in direct contact with body tissues and the tearing or abrading of tissue by rough or non-smoothed surfaces could result in rupture of blood vessels, irritation or other trauma to the tissue.

It has been found that even minute irregularities can cause irritation of body tissues. This is a particularly serious problem with contact lenses and portions of intraocular lenses that contact the eye, where the tissue is extremely sensitive. The use of silicone materials for intraocular lenses is a relatively new development. Intraocular lenses formed of silicone are advantageous in that they can be folded and inserted through smaller incisions in the cornea than previously possible, resulting in fewer post-operative complications. Rough edges due to cutting of the lens blanks or flashing as the result of molding can cause intraocular irritation.

A satisfactory method of removing flashing from the edges of such lenses, and otherwise polishing them to obtain a smooth surface and enhanced optical clarity, was heretofore unknown. Such lenses are too small to trim by hand and polishing processes used for other types of lens materials such as polymethylmethacrylate are unsatisfactory.

In addition, soft contact lenses require a highly polished finish to prevent irritation of the interior of the eyelid and corneal epithelium. The eye is extremely sensitive to imperfections in contact lenses, and even slight ridges resulting from the molding process can produce irritation and discomfort. To this date, only expensive molding procedures or individual hand-grinding techniques have been available to produce the desired finish for these lenses.

Aside from intraocular lenses and contact lenses, other medical products manufactured from silicone elastomers and which require a highly polished finish include irrigation/aspiration cannula tip sleeves for use in phacoemulsification procedures. In this surgical procedure, ultrasonic energy is applied to break-up the natural lens of the eye. The cannula is inserted through a corneal incision to the vicinity of the lens and is used to aspirate or remove the lens fragments. During this procedure, the tip of the cannula often comes into contact with the sensitive eye tissue and therefore it must be devoid of sharp, rough, or irregular edges.

Mechanical devices utilizing smooth, frictionless movement also require highly polished, smooth surfaces of their silicone products. Obtaining such a highly polished, smoothly-finished silicone article is often difficult as these products are manufactured by curing molten silicone material in molds, wherein even the most precise dies result in some flashing and/or irregular edges. The products may be trimmed and polished, but these finishing procedures are generally done by hand, and are both time consuming and expensive, as well as imprecise, so that they do not result in the totally smooth or regular surface required. Further, many of these articles, particularly those for biomedical applications, are relatively small, and/or irregularly shaped, causing difficulties in obtaining the desired finish, and/or clarity.

The removal of imperfections from small and irregularly shaped silicone products is an unsolved problem in the art. It would be of great utility to provide a simple, economic, and effective method for polishing and/or clarifying silicone products for industrial, medical, and mechanical purposes.

SUMMARY OF THE PRESENT INVENTION

The present invention solves these prior art problems and shortcomings in a simple, straightforward, yet efficient manner by providing a method of polishing shaped, silicone articles. A receptacle is charged with the articles to be polished, a mixture of a polishing medium in the form of non-abrasive polishing beads, and a solvent which permits polishing action without abrading the surface of the silicone articles. The receptacle is, agitated for a time sufficient for the non-abrasive polishing beads and solvent to remove surface irregularities from the articles. The present invention also provides a method of polishing silicone articles which improves the optical clarity of the product. No abrasive material which may scratch, become imbedded within, or otherwise damage the soft silicone articles is in the polishing medium.

In the preferred method, the solvent is an alcohol and the receptacle is a 3ar having an irregular sidewall suitable for the tumble polishing of the contents. The tumbling jar is rotated at a speed and for a time sufficient to allow the contents of the jar to actively remove surface irregularities and flashing, and to smooth and round edges and/or holes of the silicone articles. The rotation rate will also vary with the size of the tumbling jar.

An especially preferred embodiment uses absolute ethyl alcohol mixed with water as the solvent and glass polishing beads to polish and shape the edges of the silicone articles. In this method, the polishing beads are provided in a range of sizes, including beads preferably between 0.5 and 3.0 mm. The receptacle is tumbled for a time period of 1–14 days with a preferable tumbling rate of 50–100 rpm or that rate sufficient to produce the desired polishing action. Most preferred is 1–6 days and 75-90 rpm in a 1000 ml tumbling jar with a generally square cross section.

The polishing medium can be made up of non-abrasive beads which may be formed of glass, steel, or zirconia, and the like.

BRIEF DESCRIPTION OF THE DRAWINGS

For a better understanding of the present invention, reference should be had to the following detailed description, taken in conjunction with the accompanying drawings, in which like reference numerals denote like elements, and wherein.

DETAILED DESCRIPTION OF THE PREFERRED EMBODIMENTS

In the subject invention silicone articles are placed in a receptacle along with a solvent and a polishing medium and tumble polished at a speed and for a duration which permits the silicone articles to attain the desired finish. The precise combination of factors used, for example, the particular solvent, the type and size of polishing medium, the size of the receptacle, the number of articles tumbled, the speed of rotation, and the time of tumbling will vary with the size, shape, and characteristics of the silicone product to be polished.

The solvent may be an alcohol, such as ethyl, methyl, propyl, isopropyl alcohol, and the like. The alcohol may be mixed with deionized or distilled water, with preferred percentages of alcohol in the mixture ranging from 85 to 100%.

The preferred solvent is ethyl alcohol mixed with water. Although different ratios of alcohol to water may be optimal for different silicone products, the recommended solvent for the silicone products discussed below is a mixture of 95% absolute ethyl alcohol and 5% water. Distilled or deionized water may be used.

The polishing process may be performed in a variety of receptacles, and agitated in such a manner as to provide sufficient polishing action of the contained polishing objects upon the contained silicone articles. The receptacles may be various sizes and shapes, and may be formed of glass, polycarbonate, polysulphone, stainless steel, or other suitable material.

A preferred receptacle, for example, is a 1000 ml square-shaped tumbling jar. This tumbling jar is charged with, for example, approximately 200 ml of the alcohol-water solvent and approximately 600 ml of polishing beads as the ,polishing, medium. The polishing medium may contain solid or filled beads which may be formed of glass, steel shot, zirconia, or other suitable material. Bead diameters may vary from about 0.5 to about 3.0 mm, and preferably from about 0.5 to about 1.5 mm, depending on the characteristics of the articles to be polished. The number of articles to be polished may vary depending upon the size, shape and other characteristics of the articles, and the size of the polishing jar and the volume of its contents, but in general the number of articles will vary from about 1 to about 500 articles.

Figure 1:
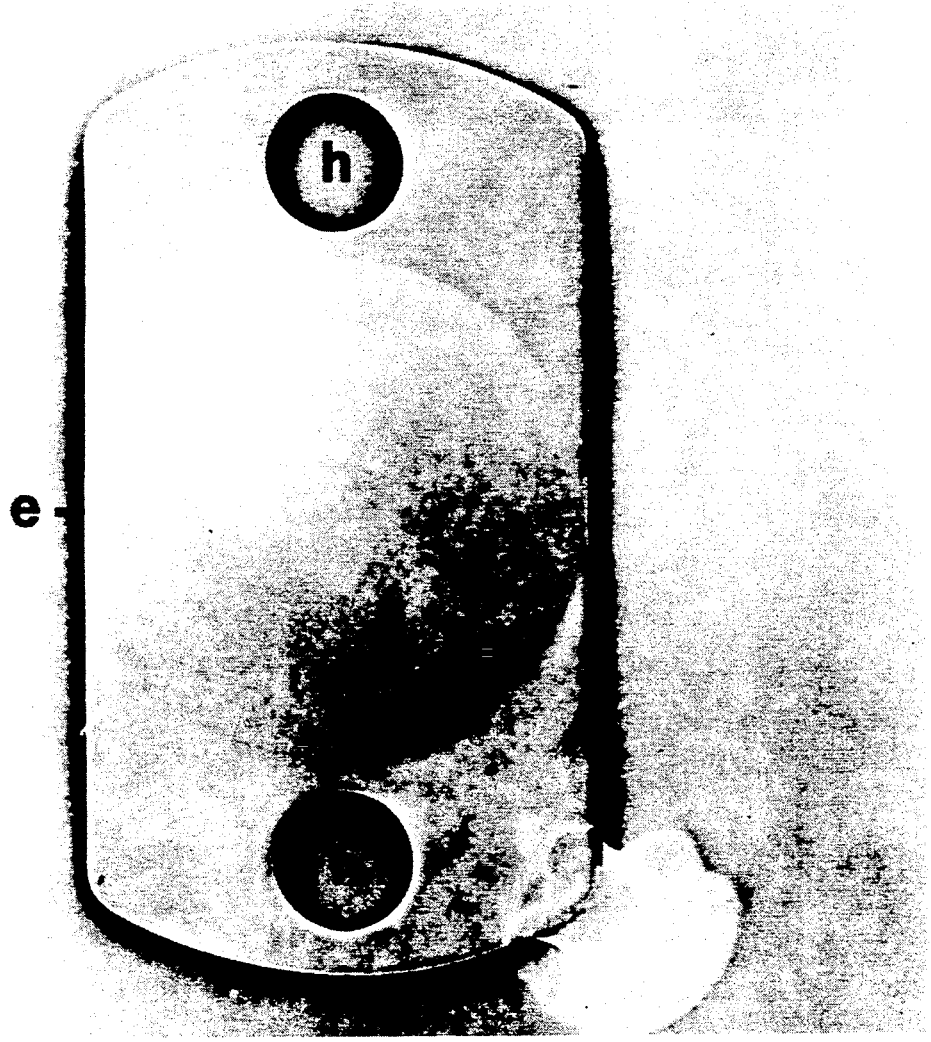
FIG. 1 is a Scanning Electron Microscope Photograph of a silicone intraocular lens which has been polished by the method of this invention, showing a smooth edge (e) and rounded manipulation holes (h) (original magnification 6.8X);.

In one embodiment of this invention, intraocular lenses of the type shown in FIG. 1, which are 10.5 mm×6.0 mm and have manipulation holes of 0.75 mm diameter are polished using a mixture of 300 ml of 0.6 mm glass beads and 300 ml of 1.4 mm glass beads. The selection of beads of different sizes is advantageous in polishing articles, for example, where in addition to an outer, more exposed surface, the inner surface of a smaller opening must be polished. For intraocular lenses, such smaller openings can be manipulation holes into which instruments are inserted to position the lens. From 1 to 150 lenses may be added to the 1000 ml jar, but to optimize the process, it is preferred to use between 10 and 60 lenses.

The receptacle is then capped and agitated in a manner sufficient to provide the desired polished finish. Agitation may be accomplished by attaching the receptacle to a rotational apparatus such as a tumbling machine, for example, Model 3BAR, (Topline Mfg. Co., Fullerton, CA). The jar and its contents are tumbled at room temperature at speeds of about 50 to about 100 rpm, for 1 to 14 days, depending upon the characteristics of the articles to be polished, the number of articles to be polished, and the size of the tumbling receptacle. For example, in a 1000 ml tumbling jar, 50 irrigation/aspiration tips may require only 24 hours of tumbling whereas 15 intraocular lenses may require 3 days. If the tumbling speed is too fast, the contents of the jar will simply adhere to the sides of the jar and will not tumble. If the tumbling speed is too low, no polishing will occur. It is therefore important to optimize the speed and time of tumbling for the particular silicone articles to be polished. The optimal speed of rotation may be arrived at readily and with minimal experimentation. For typical intraocular lenses in a 1000 ml tumbling jar, for example, the speed of rotation may vary from about 75 to about 90 rpm, preferably about 80 rpm.

The tumbled silicone articles are then removed from the receptacle and subjected to cleaning procedures. In the preferred method of cleaning, the articles are first rinsed with water or a suitable solvent, and then subjected to ultrasonic cleaning, or other suitable methods for removing residual pieces of waste silicone, tumbling beads, and tumbling solvent. For instance, a convenient method of rinsing polished articles such as intraocular lenses, which have a length of 10.5 mm and width of 6.0 mm, to separate them from the other contents of the tumbling jar, is to use a No. 6 sieve arranged above a No. 45 sieve in a convenient drainage area, such as a sink. The contents of the jar are emptied into the No. 6 sieve, and deionized water or other suitable rinsing solvent is then sprayed or poured over the material, rinsing the beads and waste silicone particles through the No. 6 sieve and leaving the silicone articles. The beads will be retained by the No. 45 sieve for reuse, while the tumbling solvent and the waste silicone particles will pass through for disposal.

The tumbled, rinsed silicone articles may then be removed from the No. 6 sieve and immersed in 100% ethyl alcohol or other suitable cleaning solvent, and placed, for example, in a Pyrex dish and in a cleaning apparatus, for example, an ultrasonic bath such as Model T28, sold by L&R Co., Kearny, New Jersey, for about 5-10 minutes. After cleaning, the tumbled silicone articles can be swabbed with deionized water, ethyl alcohol, or other suitable solvent, and inspected for polishing effectiveness, flaws, and/or clarity.

One method of inspection is the examination of the surfaces and edges of the polished silicone articles by microscopy. Scanning Electron Microscopy (SEM) clearly indicates the success or failure of the polishing process as photomicrographs depict high resolution images of the surface and/or edges of the articles. Less elaborate procedures for inspection of the polished silicone articles include the visual examination and rating of characteristics, for example, "roundness" of the edges, and the ease with which the articles are cleaned.

The polishing method of this invention may also impart additional characteristics to articles processed. These include increased optical clarity, or transparency, an important characteristic of optical lenses manufactured from silicone, and polished by the process of this invention. The polishing method extracts low molecular weight fractiles or non-cured residues of silicone. The articles may be reduced 2-3% by weight after polishing, and visually appear to be more transparent. Thus inspection of the polished products may also include examination of their optical clarity, either visually or by measurement of light refraction and/or absorbance.

The silicone articles to be polished by this method may include soft contact and intraocular lenses, biomedical products such as cannulae and catheters, prosthetic devices, various implants, and devices which contact biological tissues. Industrial applications may also include O-rings, bearings, and other articles which require a smooth, polished finish. In particular, this method is useful in the polishing of intraocular lenses and tips of cannulae used for phaco-emulsification procedures.

The silicone articles to be polished by the method of this invention are manufactured from silicone rubber or silicone elastomeric materials. These include compounds such as polydimethylsiloxanes, polydiphenylsiloxanes, and polymethylphenylsiloxanes. The articles may be unfilled or filled to various degrees with a range of materials from small quantities of silica resins to highly-filled fumed silica. The material may be pigmented or non-pigmented, and comprises those silicone elastomers which vulcanize at room temperature or with heat.

Silicone articles to be polished by the method of this invention may be manufactured materials such as RMX-3 (Starr Surgical, Corp. Monrovia, CA), Q9-5724 (Dow Corning Corp., Midland, MI), Silastic #598 (Dow Corning Corp., Midland, MI), and the like.

EXAMPLES

Example 1

Polishing of Silicone Intraocular Lenses With Various Solvents

To a 1000 ml square tumbling jar was added 200 ml of a solution consisting of 100% alcohol, about 600 ml of a mixture of 0.6 mm and 1.4 mm glass polishing beads in equal volume proportions, and 50 silicone intraocular lenses of mixed style types.

Lenses used in this example were manufactured from silicone elastomer material obtained from Starr Surgical Corp., Monrovia, Calif. by its designation RMX-3. The lens styles used were mixtures of various combination of those described in the CooperVision-CILCO catalog as product number NR960B, NR961B, NR962S, NR963B, and NR964B. All lenses were similar but not identical to the one shown in FIG. 1, and varied in width and the presence of manipulation holes. The lenses were 10.5 or 11.0 mm in length and 6.0 mm in width. The type of alcohol used as the tumbling solvent was varied. Tests were run with 95% ethyl alcohol, (95 parts 100% ethyl alcohol and 5 parts deionized water), 70% isopropyl alcohol, and "Everclear" (190 proof grain alcohol, Worldwide Distilled Products Co., St. Louis, Mo.). The tumbling jar was sealed, and tumbled in a 3BAR, Topline Mfg. Co., tumbling machine for 6 days at 82 rpm. After tumbling, the contents of the jar were poured onto a No. 6 sieve, and the retained lenses were rinsed with deionized water and removed to a Pyrex dish. The lenses in the Pyrex dish were immersed in 100% ethyl alcohol and placed in an ultrasonic bath, Model T28, L&R Co., Kearney, New Jersey, for 10 minutes. The lenses were then removed from the Pyrex dish, swabbed with deionized water, and were examined for roundness, a measure of the degree of edge polishing, and the ease of cleaning, a measure of the removal of surface irregularities. The analysis was a subjective one, wherein each tumbled lens was rated on a scale of 0 to 10, with 10 indicating both the most rounded and also the easiest to clean. Each lens within a test jar was independently rated by these scales, and a mean value was calculated for each test group. The results of these experiments indicated successful polishing in all solvents (mean scores greater than 4). The 95% ethyl alcohol solution was rated as the best solvent for this application by efficiency of polishing and ease of cleaning.

Example 2

Polishing of Silicone Intraocular Lenses With Varied Mixtures of Ethyl Alcohol and Water The polishing method of Example 1 was repeated comparing the use of ethyl alcohol and deionized water mixtures of 100%, 95%, and 90% ethyl alcohol, and using a tumbling duration of 3 days with 15 lenses per tumbling jar. The polished lenses were then examined and rated for roundness and ease of cleaning as described in Example 1. Review of the data from three individual experiments showed 95% ethyl alcohol to be the best solvent, and 90% ethyl alcohol to be better than 100% ethyl alcohol. Polished lots using 100% ethyl alcohol showed near-zero roundness, while the 95% alcohol group rated near the top of the scale (9-10), and the 90% ethyl alcohol group clustered around a lower, yet acceptable rating for intraocular lenses (4-6).

Example 3

Polishing of Silicone Intraocular Lenses With Varied Mixtures of Polishing Bead Sizes The polishing method of Example 2 was repeated using 95% ethyl alcohol as the polishing solvent, and comparing the use of either 400 ml of 0.6 mm beads and 200 ml of 1.0 mm beads, or 200 ml of 0.6 mm beads and 400 ml of 1.0 mm beads. The smaller beads were needed to polish the interior edges and surfaces of the 0.75 mm diameter manipulation holes of the lenses. The polished lenses were then examined and rated for roundness and ease of cleaning as described in Example 1. Results indicated that the higher proportion of 1 mm beads (2-1 mm beads: 1-0.6 mm beads) gave more satisfactory overall polishing results for these intraocular lenses with manipulation holes than did the higher proportion of smaller beads (1-1 mm beads: 2-0.6 mm beads).

Example 4

Polishing of Silicone Intraocular Lenses With Varied Time of Tumbling

The polishing method as described in Example 1 was followed using 95% ethyl alcohol. The duration of tumbling necessary to produce the desired finish was tested by removing tumbling jars from the tumbling machine at varied time periods between 0 and 14 days. All jars were placed onto the tumbling machine and the tumbling duration begun at the same time. Test groups of tumbling jars were removed for analysis at 8, 16, 24, 32, 40, and 48 hours and each 24 hours thereafter up to 14 days. The polished silicone lenses were then examined and rated for roundness and ease of cleaning as described in Example.1. While results indicated that the acceptable standard for polished lenses was achieved after 3 days of tumbling, the best polishing results were obtained after 7-8 days of tumbling. Continuing the tumbling process up to 14 days did not improve the quality of the product.

Example 5

Polishing of Silicone Intraocular Lenses With Varied Conditions of the Lenses: Water Saturated, Normal, and Overdried Three experimental groups of lenses were polished by the method described in Example 2: lenses which had been soaked in deionized water 24 hours prior to tumbling, normal lenses, and lenses which had been dried in an oven at 100° C. for 4 hours prior to tumbling. The tumbling solvent was 95% ethyl alcohol, and the duration of the tumbling was 3 days. The lenses were then examined and rated for roundness and ease of cleaning as described in Example 1. No significant differences in polishing quality were seen between any of the three groups of lenses.

Example 6

Polishing of Silicone Intraocular Lenses With Varied Conditions of the Lenses: Ethyl Alcohol Saturated, Normal, and Overdried The polishing method of Example 5 was repeated comparing lenses of three groups: all lenses were soaked in 100% ethyl alcohol for 24 hours and then either placed directly into the tumbling jar, permitted to dry at room temperature for 4 hours, or dried in an oven at 100° C. for 4 hours prior to tumble polishing. The lenses were then examined and rated for roundness and ease of cleaning as described in Example 1. No significant differences were noted between any of the groups of lenses.

Example 7

Polishing of Silicone Intraocular Lenses and Inspection by Scanning Electron Microscopy The method of polishing lenses was followed as described in Example 1, using 95% ethyl alcohol as the tumbling solvent. The resultant polished lenses and non-polished, control lenses were sputter-coated to provide a layer of gold approximately 100 Angstroms on the lenses. The coated lenses were then photographed in a Cambridge S120 Scanning Electron Microscope.

Figure 2:
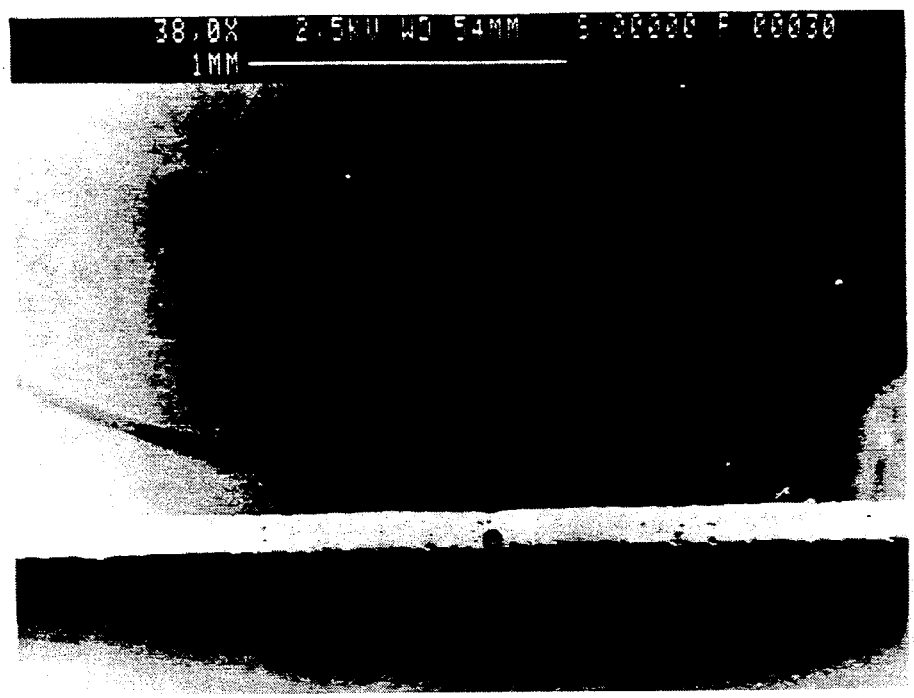
FIG. 2 is a Scanning Electron Microscope photograph of a silicone intraocular lens showing the edge (e) prior to polishing (original magnification 38X)
Figure 3:
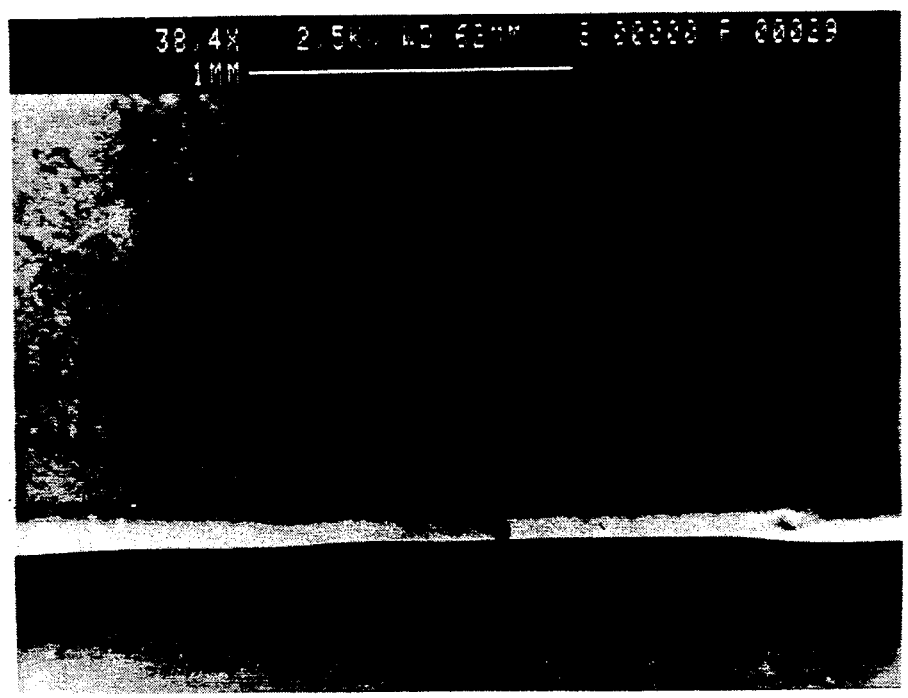
FIG. 3 is a Scanning Electron Microscope photograph of a silicone intraocular lens showing the smoothed edge (e) after polishing by the method of this invention (original magnification 38X)
Figure 4:
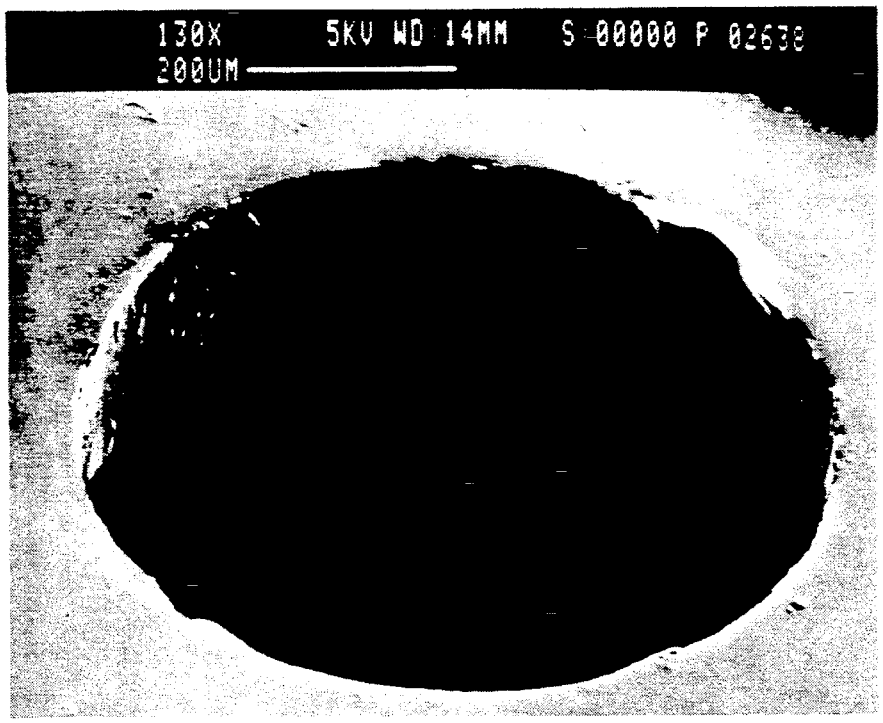
FIG. 4 is a Scanning Electron Microscope photograph of a manipulation hole of a silicone intraocular lens prior to polishing (original magnification 130X)
Figure 5:
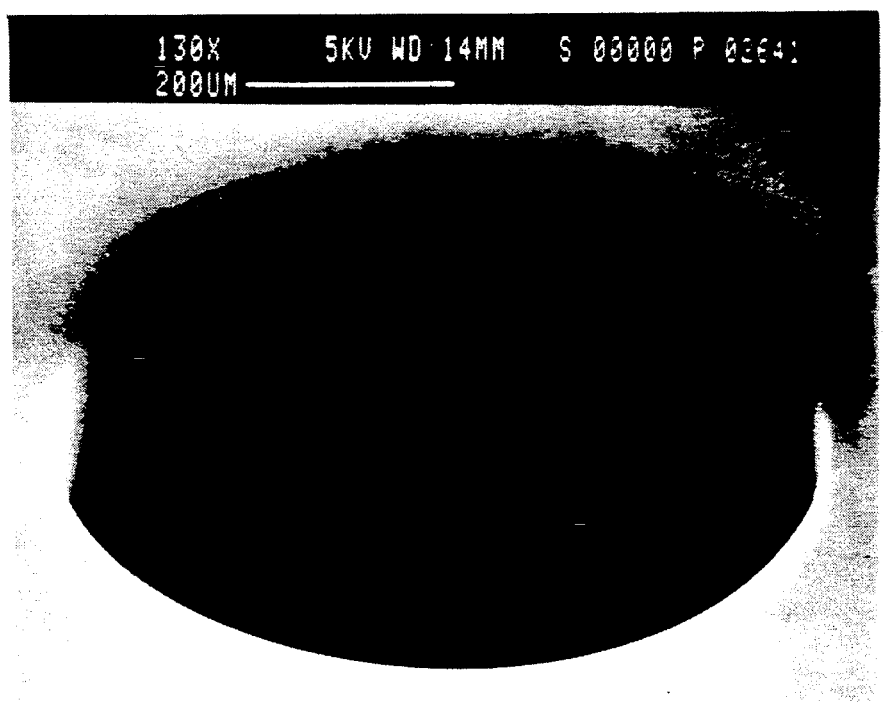
FIG. 5 is a Scanning Electron Microscope photograph of a manipulation hole of a silicone intraocular lens after tumble polishing by the method of this invention (original magnification 130X)

FIG. 2 is a Scanning Electron Micrograph (SEM) (original magnification, 38X) showing the edge of an intraocular lens prior to polishing. FIG. 3 is an SEM of a lens similar to the one shown in FIG. 2, taken after the lens had been tumble polished by the method of this Example 7 (original magnification, 38x). Note that the edges were smoothed and rounded by the polishing procedure. In a similar manner, FIG. 4 is an SEM of the manipulation holes of an intraocular lens prior to tumble polishing, and FIG. 5 is an SEM taken after a lens similar to the one shown in FIG. 4 had been tumble polished by the method of this Example 7. Note the contour of the rim of the manipulation holes after polishing was smoothed. (See FIG. 1 for orientation of edges and manipulation holes of the intraocular lens.)

Example 8

Inspection of Clarity of Polished Lenses

Figure 6:
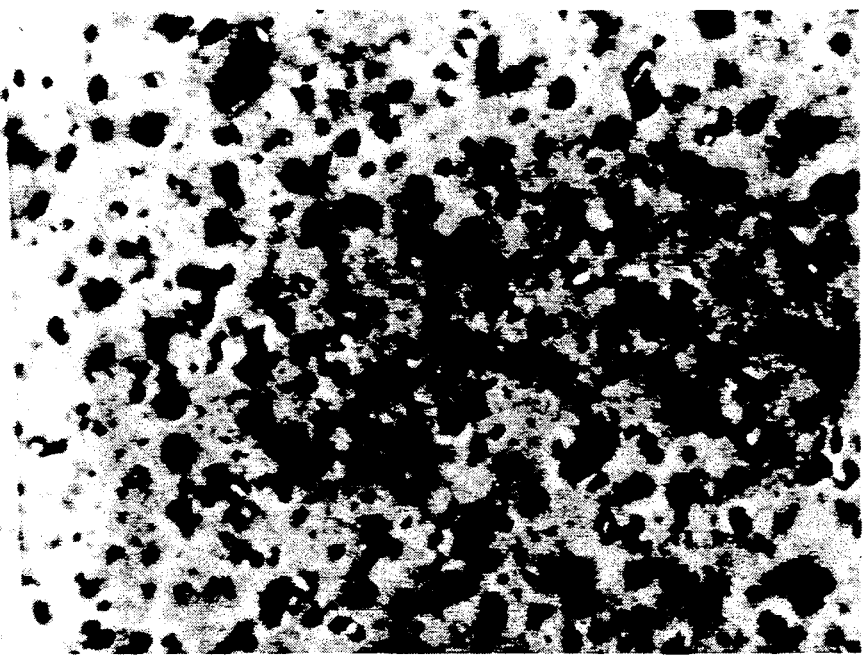
FIG. 6 is a photograph of the center of a silicone intraocular lens which has been autoclaved, but not polished (Transmission Light Microscopy, original magnification 75X)
Figure 7:
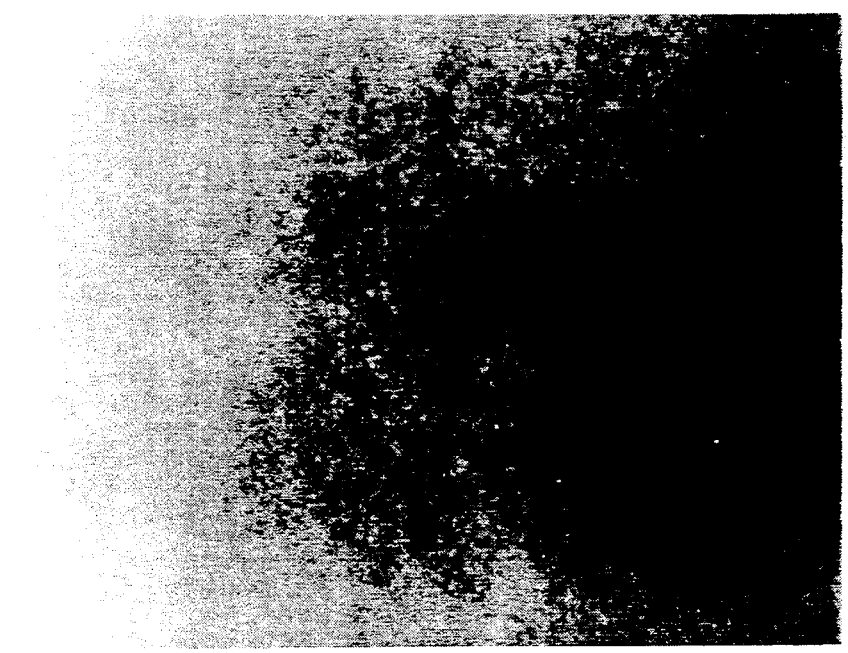
FIG. 7 is a photograph of the center of an intraocular lens which has been polished by the method of this invention, and then autoclaved (Transmission Light Microscopy, original magnification 75X)

Intraocular lenses polished by the method described in Example 7 and non-polished lenses operating as a control were steam sterilized in an autoclave apparatus at 121° C. for 25 minutes. These lenses were then inspected for optical clarity by examination through a light microscope at 75X magnification. FIG. 6 is a transmission light microscopic photograph of the central portion of an intraocular lens which had been autoclaved, but not polished (original magnification 75X). FIG. 7 is that of a similar lens which had been polished and then autoclaved (original magnification 75X). The mottled appearance of the non-polished lens in FIG. 6 is thought to be caused by the action of water and heat on non-cured silicone oligomers present in the non-polished lens. As shown in FIG. 7, a significant improvement in the optical clarity of the lens is apparent after polishing and autoclaving. This improvement is believed to be the result of the extraction of the low molecular weight silicone oligomers during the polishing process and prior to autoclaving the lens.

Example 9

Extraction of Uncured Silicon Oligomer From Non-Polished vs. Polished Lenses Intraocular lenses polished by the method of example 7 and non-polished lenses operating as a control were subjected to organic extraction procedures using hexane. The weights of the pre-extraction and post-extraction lenses were used to calculate the percentage of organic residue extracted.

About one gram of cured silicone elastomer or intraocular lenses was accurately weighed and placed in a Soxhlet extractor with 200 ml of hexane. The extractor was permitted to reflux 4-6 times per hour, and the extraction time was four hours. The extracted silicone elastomer material was then transferred to a tared test tube, and the hexane evaporated to dryness on a water bath. The test tube containing the material was then heated in an oven at 100° C. for one hour. The test tube was then cooled in a desicator and reweighed.

The difference in weight prior to and after extraction was used to calculate the percentage of hexane-extractable material. The hexane-extract isolated from the silicone elastomer or intraocular lenses was evaporated to dryness to remove hexane. A small amount of the extract residue was smeared onto a NaCl plate and scanned in a Perkin-Elmer Model 1320 Infrared spectrophotometer from 4000 $CM^{-1}$ to 700 $CM^{-1}$.

Figure 8:
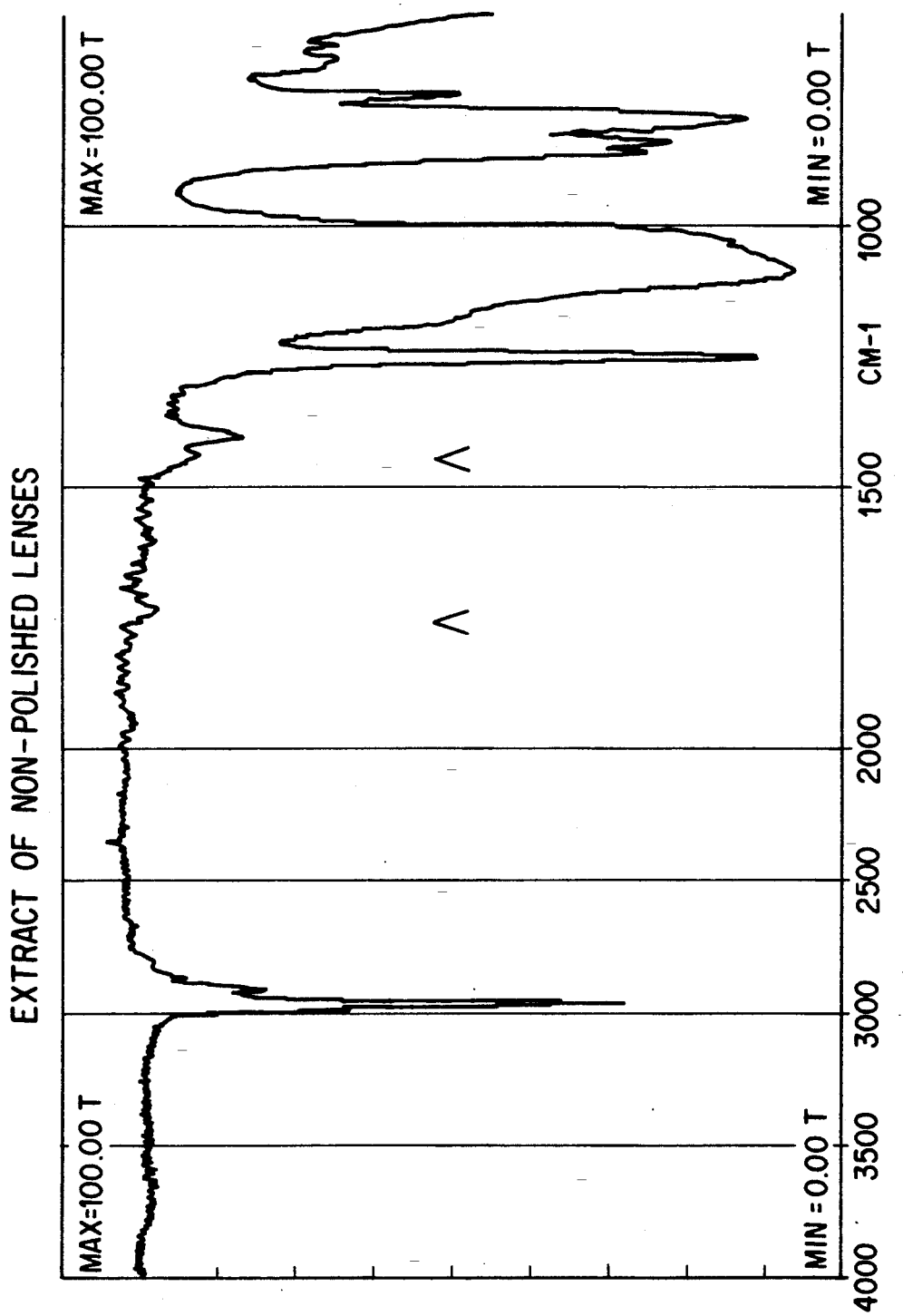
FIG. 8 is an Infrared Spectroscopy Scan of residue extracted with hexane from non-polished intraocular lenses.
Figure 9:
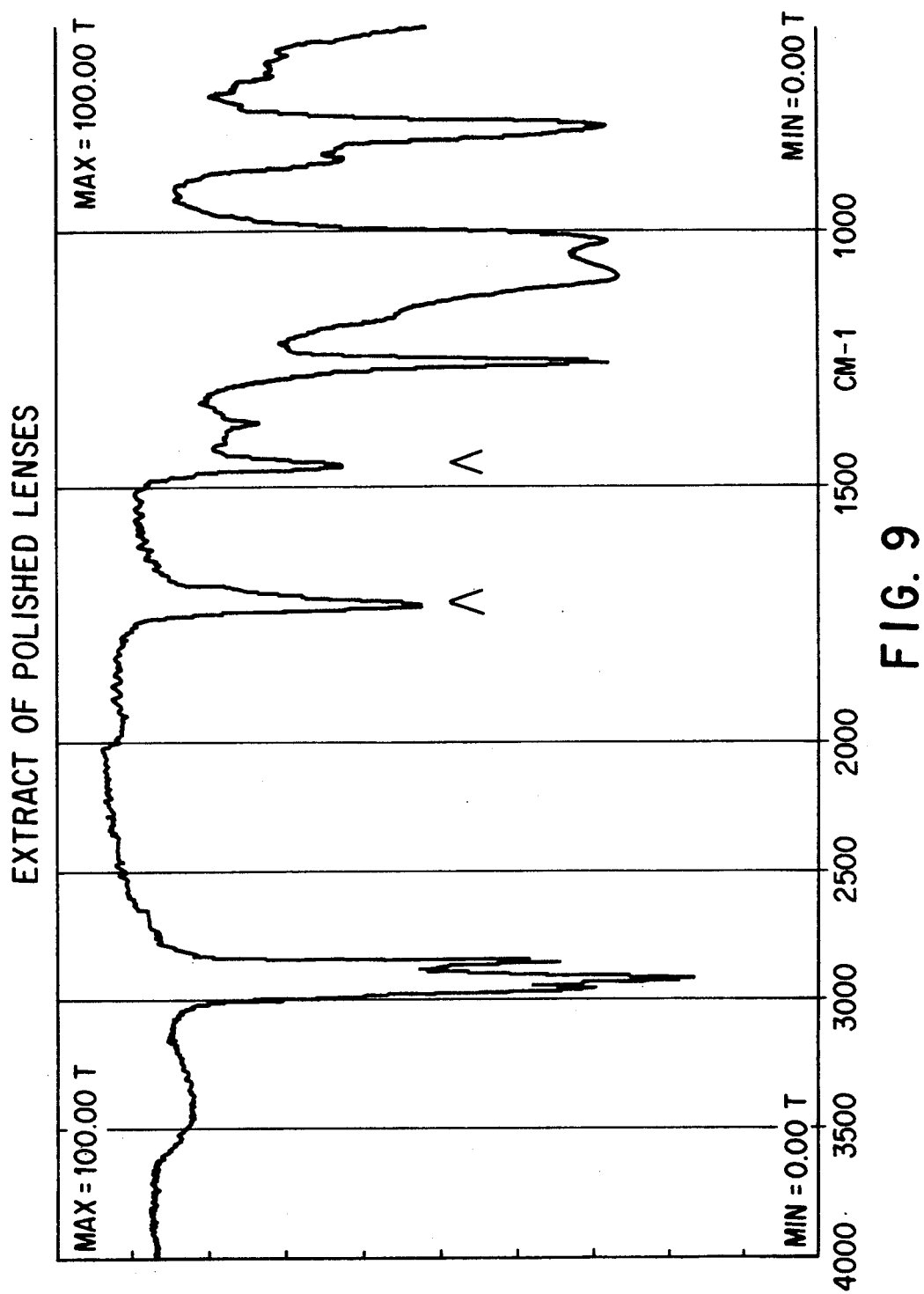
FIG. 9 is an Infrared Spectroscopy Scan of residue extracted with hexane from intraocular lenses which had been polished by the method of this invention.

The non-polished, control lenses yielded 4.0% hexane-extractable material, whereas only 0.47% was extracted from the polished lenses. The infrared absorption curve of the residue isolated from the non-polished lenses (FIG. 8) differed slightly from that of the polished lenses (FIG. 9) as indicated by the arrowheads, however both scans were identified as that of low molecular weight silicone oligomers. Three percent organic extractables were removed in the polishing process, which results in less than one percent organic extractables present in the polished lenses compared with approximately four percent organic extractables in the unpolished controls.

Example 10

Polishing of Irrigation/Aspiration Tips

Irrigation/aspiration tips manufactured for use as disposable tip cap sleeves for use in phacoemulsification procedures were polished by the method of Example 8. The tip sleeves were manufactured from silicone rubber elastomer material obtained from Dow Corning Co. (Midland, MI) as product Silastic #598. The cannula tip dimensions were as follows: overall length, 1 inch; wall thickness, 0.004 inch; overall outer thickness, 0.07 inch; diameter tip bore, 0.044 inch; diameter side aspiration bore, 0.040 inch; maximal inside diameter, 0.062 inch.

The tumbling solvent was 95% ethyl alcohol. The tumbling medium was made up of glass beads, 300 ml at 1.4 mm in diameter and 300 ml at 0.3 mm in diameter. Each tumbling jar contained 50 tips, and the tumbling duration was 24 hours. After tumbling, the tips were rinsed with deionized water, cleaned by hand-rubbing in 100% ethyl alcohol and blown dry with air. The resulting polished tips and control, non-polished tips were examined by Scanning Electron Microscopy as described in Example 8.

Figure 10:
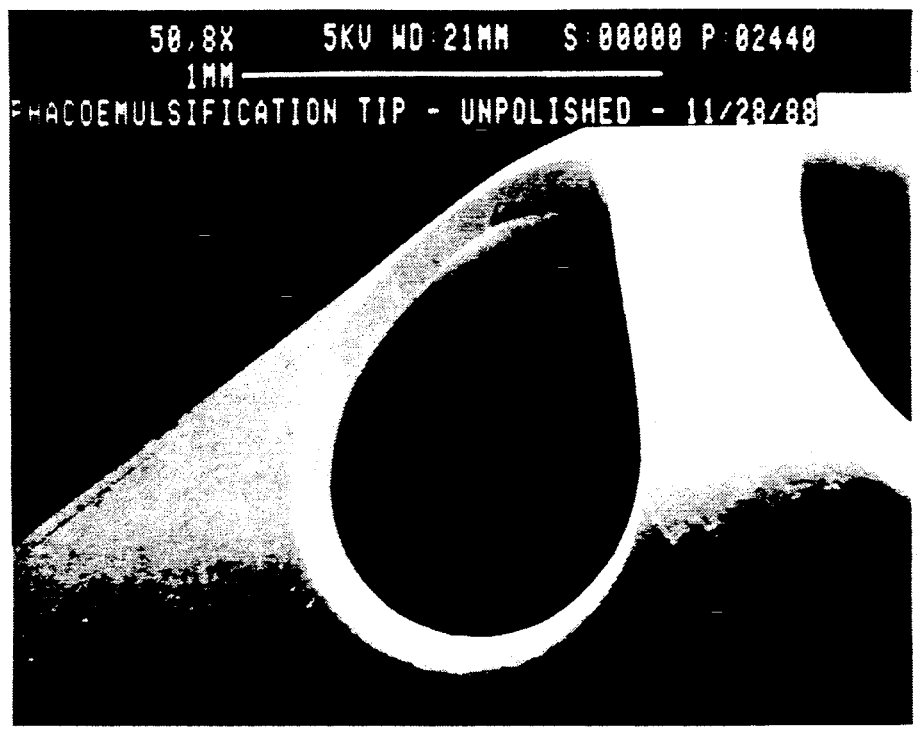
FIG. 10 is a Scanning Electron Micrograph of an unpolished irrigation/aspiration tip (original magnification 50.8X)
Figure 11:
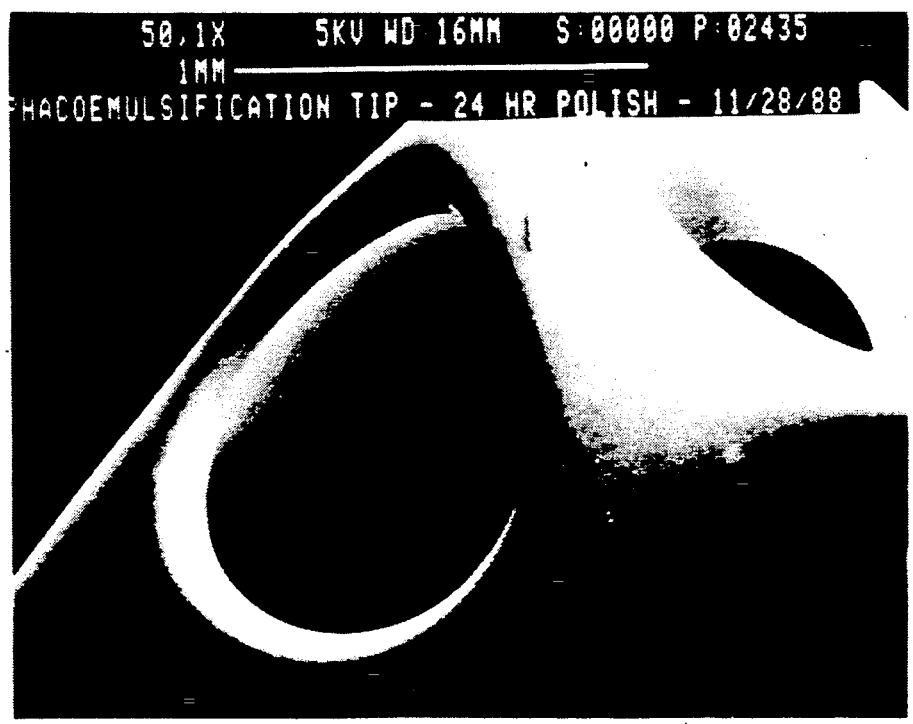
FIG. 11 is a Scanning Electron Micrograph of an irrigation/aspiration tip polished by the method of this invention (original magnification 50.1X).

FIG. 10 is a Scanning Electron Micrograph (SEM) of an unpolished tip, and FIG. 11 is an SEM of a similar tip after it had been polished by the method of this example (original magnification 50X).

Figure 12:
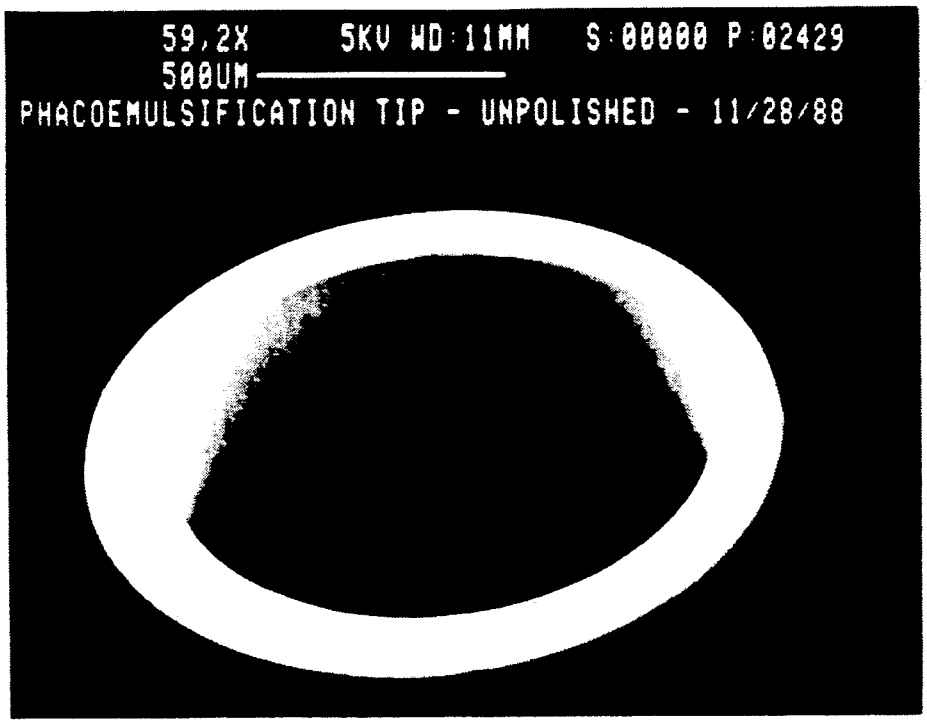
FIG. 12 is a Scanning Electron Micrograph of the bore of an unpolished irrigation/aspiration tip (original magnification 59.2X)
Figure 13:
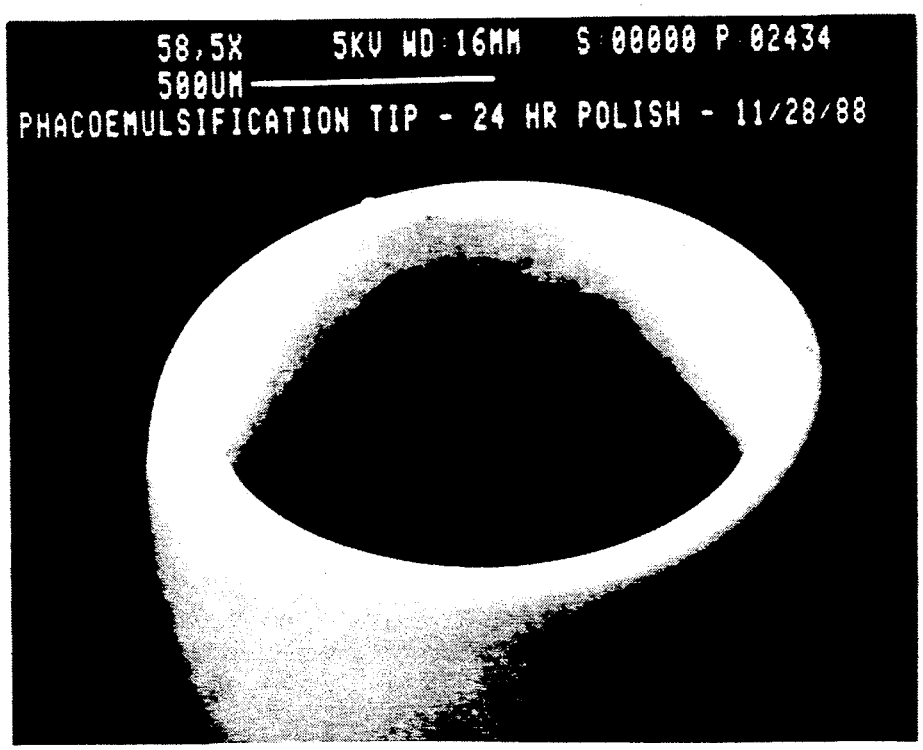
FIG. 13 is a Scanning Electron Micrograph of the bore of an irrigation/aspiration tip polished by the method of this invention (original magnification 58.5X).

FIGS. 12 and 13 are scanning electron micrographs of the bore of tips similar but not identical to those as described in FIGS. 10 and 11 prior to and after polishing, respectively (original magnification 59X).

Example 11

Polishing of O-rings

O-rings, manufactured for many applications in precision assembly were polished by the method of Example 2. Standard, commercially available silicone O-rings were obtained from McMaster-Carr, Los Angeles, Calif., by their part numbers 9396K15, 9396K17, and 9396K19. These O-rings were of the following dimensions: 9396K15, inside diameter, ¼ inch, outside diameter 3/8 inch; 9396K17, inside diameter, ⅜ inch, outside diameter ½ inch; and 9396K19, inside diameter ½ inch, outside diameter 5/8 inch. The silicone material from which the O-rings were manufactured was resistant to brake fluid and high analine point oil, and had a temperature range of −80° F. to +450° F.

The tumbling solvent used was 95% ethyl alcohol, and the tumbling beads used were 300 ml 1.4 mm and 300 ml 0.6 mm. Each 1000 ml tumbling jar contained 50 O-rings. The resulting polished O-rings and control non-polished O-rings were inspected visually. The polishing procedure produced smooth surfaces and polished flashing both on the outer and inner surfaces of the O-rings.

The embodiments as described are intended to be exemplary and not limiting. Other embodiments and variations are contemplated as falling within the scope of the appended claims.

I claim:

1. A method of polishing shaped silicone articles comprising the steps of:
   a) charging a receptacle with a mixture of non-abrasive polishing beads, a solvent which permits polishing action without abrading the surface of the silicone article, and a plurality of shaped silicone articles; and
   b) agitating the contents of the receptacle for a time sufficient for the polishing objects and solvent to remove surface irregularities from the silicone articles.

2. The method of claim 1, wherein said step of charging with a solvent includes charging with a solution of alcohol or mixture of alcohols and water.

3. The method of claim 2, wherein said step of charging with a solution of alcohol and water includes charging with a solution of between from about 50% to about 100% alcohol by volume.

4. The method of claim 3, wherein said step of charging with a solution of alcohol and water includes charging with ethyl alcohol and water.

5. The method of claim 4, wherein said step of charging with ethyl alcohol and water includes charging with a solution of about 95% ethyl alcohol by volume.

6. The method of claim 1, wherein said step of charging of a receptacle includes charging a receptacle which is a tumbling jar.

7. The method of claim 1, wherein said step of agitating of the contents of the receptacle includes rotating the receptacle at a speed and for a time sufficient to remove surface irregularities from the silicone articles.

8. The method of claim 1, wherein said step of charging with silicone articles includes charging with contact lenses.

9. The method of claim 1, wherein said step of charging with silicone articles includes charging with intraocular lenses.

10. The method of claim 1, wherein said step of charging with silicone articles includes charging with cannula tips.

11. The method of claim 1, wherein said step of charging with silicone articles includes charging with disposable silicone tips used in phacoemulsification procedures.

12. The method of claim 1, wherein said step of charging with silicone articles includes charging with O-rings.

13. The method of claim 1, wherein said step of charging with a mixture of non-abrasive polishing beads charging with glass polishing beads.

14. The method of claim 1, wherein said step of charging with a mixture of non-abrasive polishing beads includes charging with zirconia polishing beads.

15. The method of claim 1, wherein said step of charging with a mixture of non-abrasive polishing beads includes charging with steel shot.

16. The method of claim 1, wherein at least some of the non-abrasive polishing beads are in the size range of about 0.5 to about 3.0 nm in diameter.

17. The method of claim 7, wherein said step of agitating the contents of a receptacle includes tumbling a 1000 ml receptacle at a rate of about 80 rpm.

18. The method of claim 1, wherein said step of agitating the contents of a receptacle is continued for a time period of from about 1 to about 14 days.

19. The method of claim 1, further comprising the step of:

cleaning the silicone articles of the solvent, polishing beads, and waste silicone particles.

20. The method of claim 18, wherein said step of cleaning includes rinsing the polished articles on a sieve that is sized to retain the silicone articles while allowing the alcohol and polishing beads to pass through.

21. The method of claim 19, wherein said step of charging with silicone articles includes charging with silicone articles selected from silicone contact lenses, silicone intraocular lenses, silicone O-rings, and silicone cannula tips.

22. The method of claim 1, wherein said step of agitating includes agitating the contents of the receptacle for a time sufficient to produce improvement in optical transparency of the silicon articles.

23. The method of claim 22, wherein said step of agitating further includes agitating the contents of the receptacle for a time sufficient to extract 2-3% by weight silicone fractiles from the silicone articles.

* * * * *